May 15, 1951 R. E. QUINN 2,553,472
SEDIMENT TESTER FILTER DISK RESTRAINER
Filed May 12, 1950

INVENTOR,
ROY E. QUINN,
BY Herbert A. Weinturn,
ATTORNEY.

Patented May 15, 1951

2,553,472

UNITED STATES PATENT OFFICE 2,553,472

SEDIMENT TESTER FILTER DISK RESTRAINER

Roy E. Quinn, Indianapolis, Ind., assignor to The Langsenkamp-Wheeler Brass Works, Inc., Indianapolis, Ind., a corporation of Indiana Application May 12, 1950, Serial No. 161,584

5 Claims. (Cl. 73—61)

This invention relates to means for retaining in position a filter disc such as may be employed in a milk sediment tester.

In certain prior art structures, there is a nozzle end detachably secured to the lower end of a cylinder, and the nozzle carries a perforated seat on which the filter disc normally rests. Then in the end of the cylinder to which the nozzle is engaged, there is positioned a cross bar diametrically across the end of the cylinder at a distance spaced above the filter disc, this cross bar serving as a means normally to prevent the filter disc from floating entirely away from alignment with the foraminated seat when milk is pulled upwardly through the nozzle and into the cylinder.

However in this construction, it frequently occurs that the filter disc may shift laterally of the cylinder in relation to the cross bar so that when milk is forced out from the cylinder through the disc as it is intended to be, to discharge through the nozzle, the disc does not always return to its full coverage of the perforated or foraminated seat so that all of the milk does not flow through the filter disc, but by-passes it, and thus does not give the true indication of the amount of sediment which may have been in the sample of milk pulled up into the cylinder.

It is a primary purpose of this invention to provide an axillary means to be used in conjunction with the cross bar for preventing effectively the lateral shifting of the filter disc when the milk is pulled upwardly therepast, so that the filter disc will always reseat itself on the perforated seat, to insure that all of the milk is returned to the filter disc without any by-passing effect.

A further primary object of the invention is to provide such an axillary means and an exceedingly simple form, and also in that form which may be removed if desired for cleaning purposes in order to maintain the desired and required sanitation of all the parts in contact with the milk.

These and other objects and advantages of the invention will become apparent to those versed in the art in the following description of one particular form, as shown by the accompanying drawing, in which Fig. 1 is a view in perspective of the attachment embodying the invention;

Figure 2:
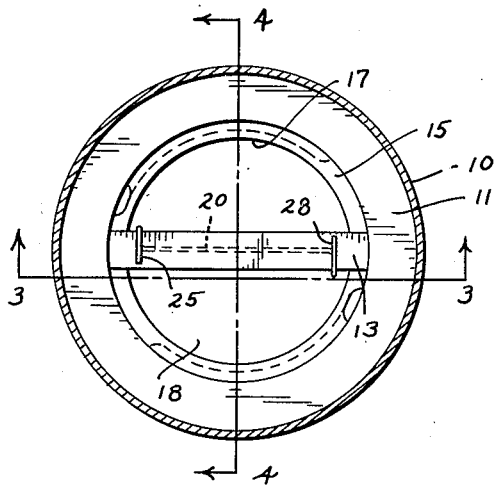
Fig. 2 is a horizontal transverse section through a structure to which the invention is applied.
Figure 3:
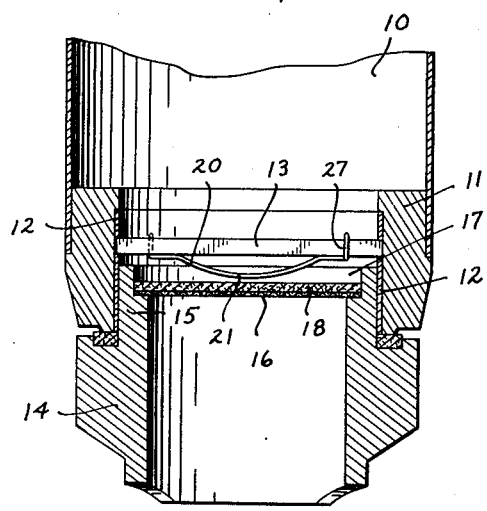
Fig. 3 is a view in vertical section on the line 3—3 in Fig. 2.
Figure 4:
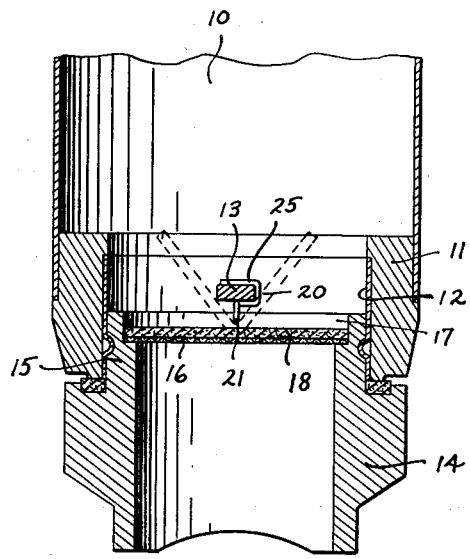
Fig. 4 is a vertical section on the line 4—4 in Fig. 2.

In the lower end of a cylinder 10 there is fixed a ferrule 11 which in turn carries a sleeve 12. Diametrically positioned across the sleeve 12 is a bar 13 rectangular in cross section. As indicated in Figs. 3 and 4, this bar 13 is spaced a distance from the lower end of the sleeve 12. The sleeve 12 is permanently connected to the ferrule 11.

A nozzle 14 is formed to telescope by an upper end portion 15 within the sleeve 12, and by any suitable means be detachably secured therein. Within the upper portion of this part 15, there is provided a foraminated floor 16 extending entirely thereacross. This floor 16 is spaced below the top portion of the part 15 in order to provide a recess 17 into which is positioned a filter disc 18. This disc 18 is placed upon the floor 16 when the nozzle 14 is detached from the sleeve 12, and then the nozzle with this filter disc in place has its upper end portion 15 inserted within the sleeve 12 and held therein. For practical purposes in construction and in the assembly of the various parts, the bar 13 is thus spaced a distance above the top side of the filter disc 18. This bar 13 is provided to be in the path of the filter disc 18 when it is lifted from the floor 16 as milk is pulled up through the nozzle 14 and into the cylinder 10. Normally the filter disc will tend to fold into some such position as indicated by the dash lines in Fig. 4 to act in effect as a valve. Then when the upflow of the milk through the nozzle is stopped, and the milk is in the cylinder 10, the return flow of the milk will cause the filter disc 18 to tend to return to its flattened condition on the floor 16. But, as above indicated, due to the width of the bar 16, and also its necessary spacing above the top side of the filter disc 18, there is the possibility that in the upflow of the milk through the floor 16, the filter disc 18 will tend to be floated to one side of its central most position, and then upon its return to the floor 16, will be in a shifted position whereby the disc does not entirely cover the floor 16.

To the bar 13 I attached a wire member generally designated by the numeral 20. This wire member 20 has a centrally downwardly bowed length 21, from the outer ends of which the wire continues in straight portions 22 and 33 in axial alignment in the same straight line.

Figure 1:
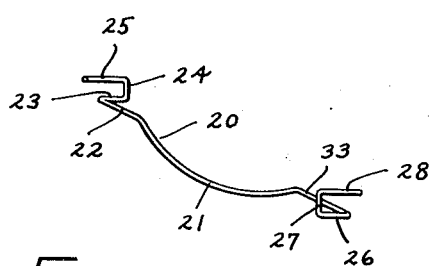

Referring to Fig. 1, the wire continues from the length 22 by a substantially right angle bend into a short length 23, from the right-hand end of which the wire continues upwardly through a vertical length 24 which is substantially the dimension of the vertical thickness of the bar 13.

Then from the top end of the wire length 24, the wire continues back to the left in parallel relation to the wire portion 23, by a length designated by the numeral 25. The wire lengths 23 and 25 define a plane which is at right angles to the plane defined by the bowed portion 21.

From the outer end of the wire portion 33, the wire continues through a horizontal length 26 at right angles to the length 33, and from the left-hand end, that is of the length 26, the wire continues through a vertically disposed portion 27 equal in length to the vertical thickness of the bar 13 thence turned at right angles thereto into a length 28. The horizontal wire lengths 23 and 26 are each substantially equal to one-half of the horizontal width of the bar 13.

The member 20 is attached to the bar 13 by sliding the portion 25 over the top side of the bar 13 with the portion 23 thereunder, these two lengths being in compressive contact with the top and bottom faces of the bar 13, and the vertical member 24 is brought into contact with the vertical side of the bar 13. Then the portions 28 and 26 are pushed over and under respectively the bar 13, so as to bring the bowed portion 21 in a central plane vertically through the bar 13, and to extend downwardly from the underside thereof, as best indicated in Fig. 3.

The portion 21 extends downwardly from the underside of the bar 13 a distance which will bring that portion 21 into close proximity with the top side of the filter disc 18 when the nozzle 14 is secured in the sleeve 12, but with a slight clearance left therebetween. Then when the milk is pulled through the nozzle 14 tending to lift the disc 18 from the floor 16, the filter disc will be centrally contacted almost immediately by the central lower portion of the bow 21. Then as the disc 18 tends to fold upwardly on either side, to assume the maximum probable position as indicated by the dash lines in Fig. 4, the disc 18 will be maintained centrally of the floor 16 without tending to shift laterally in any direction thereover. By reason of the bowed portion 21 being present below the bar 13, the hinge line of the disc 18 is not straight, but tends to assume this arcuate line of the underside of the bow portion 21, which very effectively prevents shifting longitudinally of the bow 21, as well as laterally thereof.

The member 20 is preferably made out of a spring wire so that it may be snapped on and off of the bar 13 for removal as may be desired, and for replacement thereon.

While I have herein shown and described my invention in the one particular form, it is obvious that structural variations may be employed without departing from the spirit of the invention, and I therefore do not desire to be limited to that precise form beyond the limitations which may be imposed by the following claims.

I claim:

1. For a milk sediment tester having a chamber into which sample milk is carried, a nozzle detachably carried at an opening into the chamber, a foraminous floor across the nozzle, an annular wall around the floor to retain a filter disc on the floor, and a bar fixed across said opening in spaced relation from said floor, a disc restrainer for attachment to said bar comprising a wire having a centrally downwardly bowed length; a straight length extending from one end of and in the plane of the bow; a side-turned length extending from the straight length; an up-turned length continuing from the side-turned length; a terminal length extending from the top of the up-turned length in substantially parallel relation to said side-turned length; a second straight length continuing from the other end of said bow in axial alignment with said straight length; a side-turned length extending laterally from the outer end of the second straight length in a direction opposite to and parallel of said first side-turned length; an up-turned length continuing from the said second side-turned length; and a terminal length continuing from the upper end of the second up-turned end over and substantially parallel to the second side-turned length.

2. For a milk sediment tester having a chamber into which sample milk is carried, a nozzle detachably carried at an opening into the chamber, a foraminous floor across the nozzle, an annular wall around the floor to retain a filter disc on the floor, and a bar fixed across said opening in spaced relation from said floor, a disc restrainer for attachment to said bar comprising a wire having a centrally downwardly bowed length; a straight length extending from one end of and in the plane of the bow; a side-turned length extending from the straight length; an up-turned length continuing from the side-turned length; a terminal length extending from the top of the up-turned length in substantially parallel relation to said side-turned length; a second straight length continuing from the other end of said bow in axial alignment with said straight length; a side-turned length extending laterally from the outer end of the second straight length in a direction opposite to and parallel of said first side-turned length; an up-turned length continuing from the said second side-turned length; and a terminal length continuing from the upper end of the second up-turned end over and substantially parallel to the second side-turned length; both of said side-turned lengths being equal in length to approximately one-half the width of said bar, and both of said up-turned lengths being slightly less than the thickness of the bar whereby the bar may be elastically gripped between the said side-turned, terminal, and over-turned lengths respectively.

3. In a sediment tester having a filter disc travel limiting bar, a disc restrainer comprising a wire member having uppermost oppositely directed fingers to engage over the bar from opposite sides; wire-lengths downwardly extending from opposite end portions of the fingers; under-turned wire-lengths extending from the lower ends of the downwardly turned lengths, under and substantially parallel to said fingers; and a downwardly bowed wire length interconnecting with the ends of said under-turned lengths.

4. In a sediment tester having a filter disc travel limiting bar, a disc restrainer comprising a wire member having uppermost oppositely directed fingers to engage over the bar from opposite sides; wire-lengths downwardly extending from opposite end portions of the fingers; under-turned wire-lengths extending from the lower ends of the downwardly turned lengths, under and substantially parallel to said fingers; and a downwardly bowed wire length interconnecting with the ends of said under-turned lengths; and axially aligned straight wire-lengths spacing said bowed length from the under-turned lengths.

5. In a sediment tester having a filter disc travel limiting bar, a disc restrainer comprising a wire member having uppermost oppositely directed fingers to engage over the bar from opposite sides; wire-lengths downwardly extending from opposite end portions of the fingers; under-turned wire-lengths extending from the lower ends of the downwardly turned lengths, under and substantially parallel to said fingers; and a downwardly bowed wire length interconnecting with the ends of said under-turned lengths; and axially aligned straight wire-lengths spacing said bowed length from the under-turned lengths; each of said under-turned lengths being equal approximately to half the width of said bar, and each of said down-turned lengths being slightly less in length than the thickness of said bar; whereby said retainer may be elastically engaged to the bar by compressive action between the fingers extending over the top side and the under-turned lengths under the under bar side, and the bowed length extending downwardly from under the bar and centrally aligned longitudinally thereof when said downwardly extending lengths abut the bar from opposite sides.

ROY E. QUINN.

REFERENCES CITED

The following references are of record in the file of this patent:

UNITED STATES PATENTS

| Number | Name | Date |
|---|---|---|
| 1,893,735 | Evers | Jan. 10, 1933 |
| 2,197,909 | Wendler | Apr. 23, 1940 |
| 2,463,481 | Ferraez, Jr. | Mar. 1, 1949 |